(12) United States Patent
Fang

(10) Patent No.: US 11,351,896 B2
(45) Date of Patent: Jun. 7, 2022

(54) UNIVERSAL CAR SEAT COVER

(71) Applicant: Huyan Fang, Secaucus, NJ (US)

(72) Inventor: Huyan Fang, Secaucus, NJ (US)

( * ) Notice: Subject to any disclaimer, the term of this patent is extended or adjusted under 35 U.S.C. 154(b) by 0 days.

(21) Appl. No.: 17/247,853

(22) Filed: Dec. 28, 2020

(65) Prior Publication Data
US 2021/0188139 A1    Jun. 24, 2021

Related U.S. Application Data

(60) Provisional application No. 62/953,426, filed on Dec. 24, 2019.

(51) Int. Cl.
*B60N 2/60* (2006.01)

(52) U.S. Cl.
CPC .................. *B60N 2/6036* (2013.01)

(58) Field of Classification Search
CPC .................................. B60N 2/6036
USPC ........................... 297/228.13, 229
See application file for complete search history.

(56) References Cited

U.S. PATENT DOCUMENTS

| | | | | |
|---|---|---|---|---|
| 3,892,440 | A * | 7/1975 | Dudley | B60N 2/6027 297/229 X |
| 5,803,539 | A * | 9/1998 | Dewar | B60N 2/6054 297/228.13 |
| 2015/0069804 | A1 * | 3/2015 | Long | 297/228.13 |

\* cited by examiner

*Primary Examiner* — Anthony D Barfield
(74) *Attorney, Agent, or Firm* — Dunlap Bennett & Ludwig, PLLC

(57) ABSTRACT

A universal car seat cover system enabling an accurate and adaptable fit is provided. The accurate fit is facilitated by a headrest-receiving and headrest-securing portion. The upper front and rear portions of the universal car seat cover is movable between an open condition for receiving the headrest and an overlapping condition for securing the headrest, wherein the upper rear portions engage one or more headrest supports through integrated post slots provided by the upper rear portion. Loops interconnect separate front and seat portions of the universal car seat cover, and the loops associate with butterfly anchors to further facilitate a selectively accurate fit. The adaptable fit is by way of a two-point anchoring system enabling selective adaptability of portions of the seat cover system to fit a variety of sizes of vehicular seats, wherein the two-point anchoring system embodies the loop-butterfly anchors and the secured overlapping condition, respectively.

5 Claims, 4 Drawing Sheets

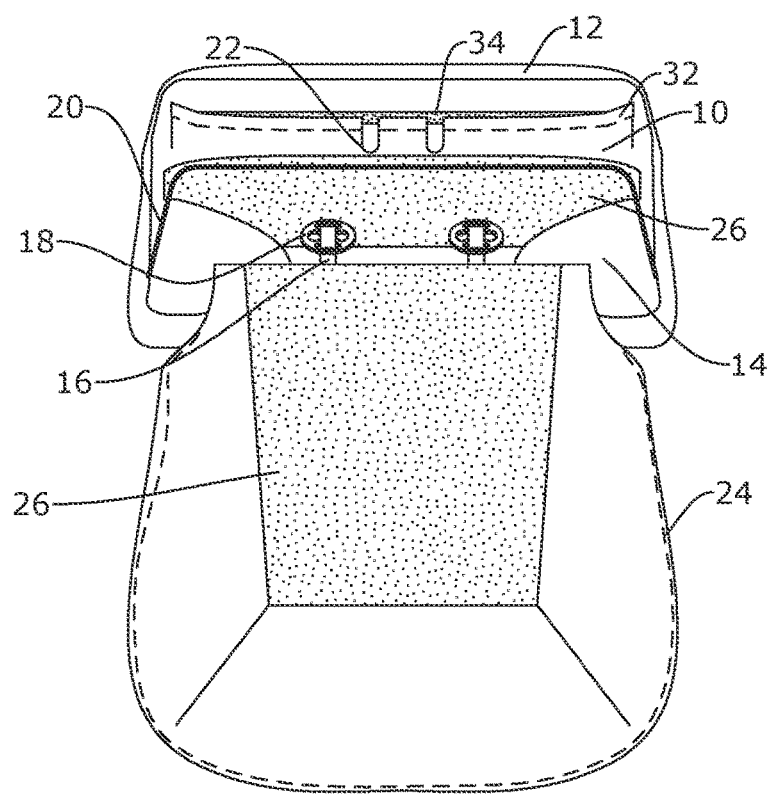
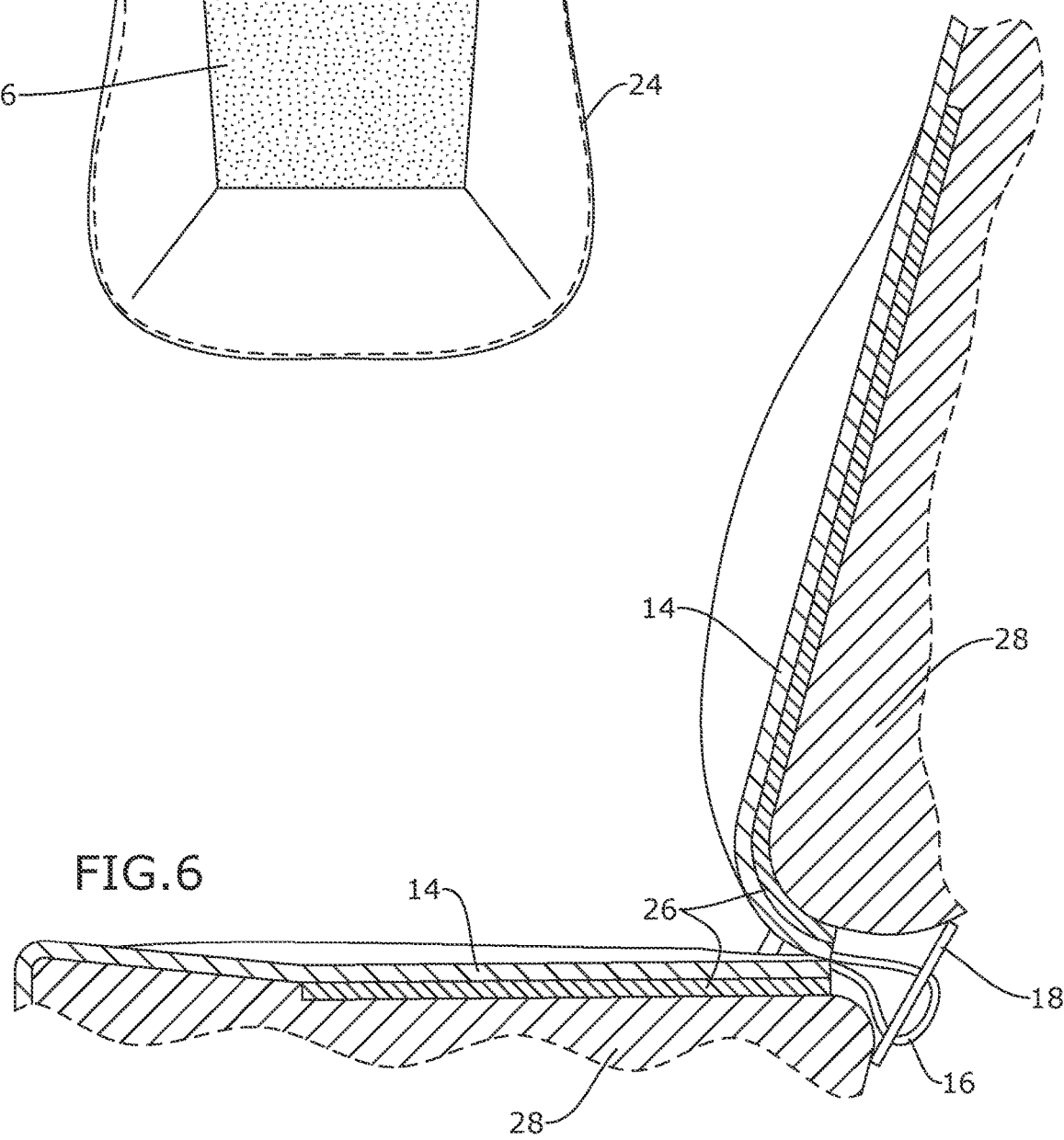

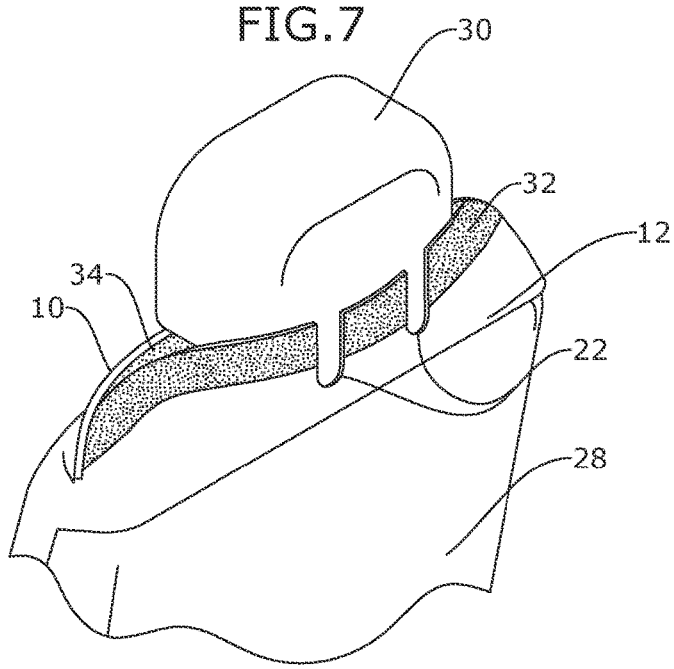
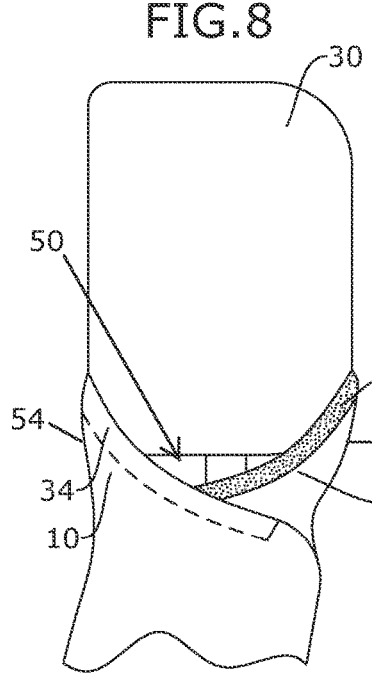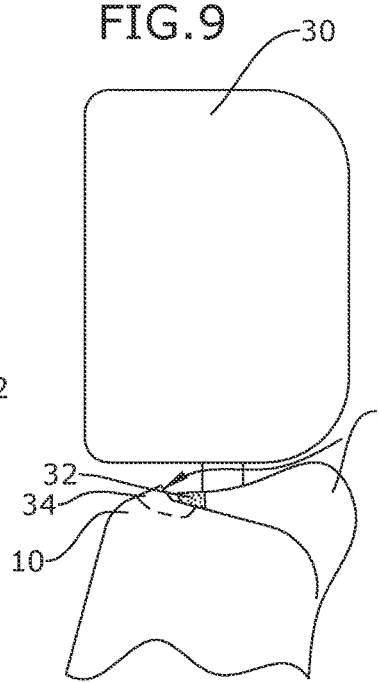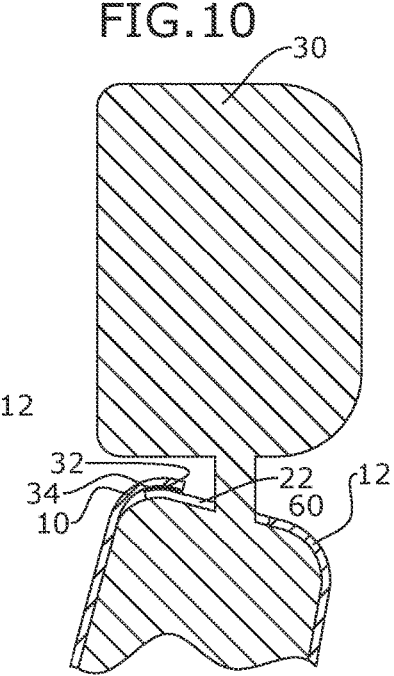

UNIVERSAL CAR SEAT COVER

CROSS-REFERENCE TO RELATED APPLICATION

This application claims the benefit of priority of U.S. provisional applications: No. 62/953,426 filed 24 Dec. 2019, the contents of which are herein incorporated by reference.

BACKGROUND OF THE INVENTION

The present invention relates to seat covers and, more particularly, a universal car seat cover adapted for an accurate and/or adaptable fit.

Seat covers for cars can be difficult, complicated, and time-consuming to install, and this is important because seat covers do not stay in place and tend to slide around during use when not installed properly.

Specifically, installation may require removal of parts, usually the headrest, of the seat to properly install the covers. In short, prior to the present invention, vehicular seat covers could only be installed after many strenuous steps, making the installation process lengthy and often frustrating, wherein outcomes were not always desirable.

As can be seen, there is a need for a universal car seat cover adapted for an accurate fit.

The present invention provides for a more secure and streamlined installation process to protect the original upholstery of vehicle seats. The universal seat cover embodied in the present invention allows for a secure fit on various vehicles, while being easier to use and not requiring much effort for installation as they can just slip over the seat without removing the headrest or other parts of the seat, thereby simplifying the installation process. The elastic around the sides help to form the cover to the seat and stay in place. The present invention also features a textured silicone backing at the interior that allows the cover not to slide when an individual enters or exits the vehicle.

Additionally, this is also a need for the universal car seat cover providing a means for an adaptable fit, thereby enabling the seat cover to adapt to the length and/or width of the seat based on the unique size of the relevant vehicle's seats.

Many covers for the cushions of vehicular (bucket) seats are advertised as universal, but do not always come equipped with features that allow the customer to adapt the size and fit if necessary. This forces the customer to try to install a cushion cover that is too big or too small, resulting in a poor fit and possibly a frustrating installation experience and an uncomfortable driving experience. In other words, while most car seat cushion covers are designed to fit a variety of cars, they do not feature any additional attributes or hardware that allows the consumer to adjust the size and fit of the cushions, meaning the cushions cannot accommodate any slight deviations in seat size.

As can be seen, there is a need for a universal car seat cover providing an adaptable system enabling a user to relax or stretch the length of the seat cover based on the unique size of the relevant vehicle's seats. Furthermore, by featuring a separate backrest cover, seat cover, and headrest cover, the inventive seat cushion accommodates various sizes of bucket seats, creating a range of fits that will accommodate most vehicle bucket seats.

As a result, unlike other universal fit cushions, the seat cushion embodied by the present invention can be slightly adjusted to accommodate a range of seat heights, depths, and lengths.

SUMMARY OF THE INVENTION

In one aspect of the present invention, a universal seat cover includes the following: a front upper portion; a rear upper portion, wherein said upper portions, in an overlapped condition, overlap along respective distal ends by a peripheral distance, and wherein said distal ends are movable between the overlapped condition to an open condition providing a headrest opening dimensioned to slidably receive a headrest of a vehicular seat; and a front cover portion, wherein the headrest opening having a cross-sectional surface area of between twelve to eighteen inches by three to six inches; further including removable fasteners on each of the respective distal ends, wherein the removably fasteners connect in the overlapping condition; one or more headrest support slots along the distal end of the rear upper portion, wherein each headdress slot is dimensioned to slidably receive a support member of said headrest in the overlapping condition; a removable fastener on each of the respective distal ends, wherein said removable fasteners connect in the overlapping condition.

In another aspect of the present invention, the universal seat cover further includes the following: a seat cover portion; at least one loop extending between the seat cover portion and the front cover portion; and a butterfly anchor associated with each loop; a textured non-slip silicone backing along an interior surface of the seat cover portion and the front cover portion; a fitted elastic trim along a periphery of the seat cover portion, wherein the front cover portion embodies a side-less design; and further including an elastic strap spanning the side-less design.

These and other features, aspects and advantages of the present invention will become better understood with reference to the following drawings, description and claims.

BRIEF DESCRIPTION OF THE DRAWINGS

FIG. 5 is a rear bottom perspective view of an exemplary embodiment of the present invention;

FIG. 6 is a section view of an exemplary embodiment of the present invention, taken along line 6-6 in FIG. 1;

FIG. 7 is a detailed top perspective view of an exemplary embodiment of the present invention, illustrating the upper front and rear cover portions 10 and 12, respectively, providing a headrest opening 50 for receiving a headrest 30;

FIG. 8 is a detailed side elevation view of an exemplary embodiment of the present invention, illustrating the headrest 30 sliding through the headrest opening 50;

FIG. 9 is a detailed side elevation view of an exemplary embodiment of the present invention, illustrating the upper rear portion 12 tucking into the upper front cover portions, overlapping their respective edge portions; and FIG. 10 is a detailed section view of an exemplary embodiment of FIGS. 8 and 9, illustrating formation of a secured engagement/upper anchor point.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a universal car seat cover system enabling an accurate and adaptable fit. The accurate fit is facilitated by a headrest-receiving and headrest-securing portion. The upper front and rear portions of the universal car seat cover is movable between an open condition for receiving the headrest and an overlapping condition for securing the headrest, wherein the upper rear portions engage one or more headrest supports through integrated post slots provided by the upper rear portion. Loops interconnect separate front and seat portions of the universal car seat cover, and the loops associate with butterfly anchors to further facilitate a selectively accurate fit. The adaptable fit is by way of a two-point anchoring system enabling selective adaptability of portions of the seat cover system to fit a variety of sizes of vehicular seats, wherein the two-point anchoring system embodies the loop-butterfly anchors and the secured overlapping condition, respectively.

Figures 1, 2:
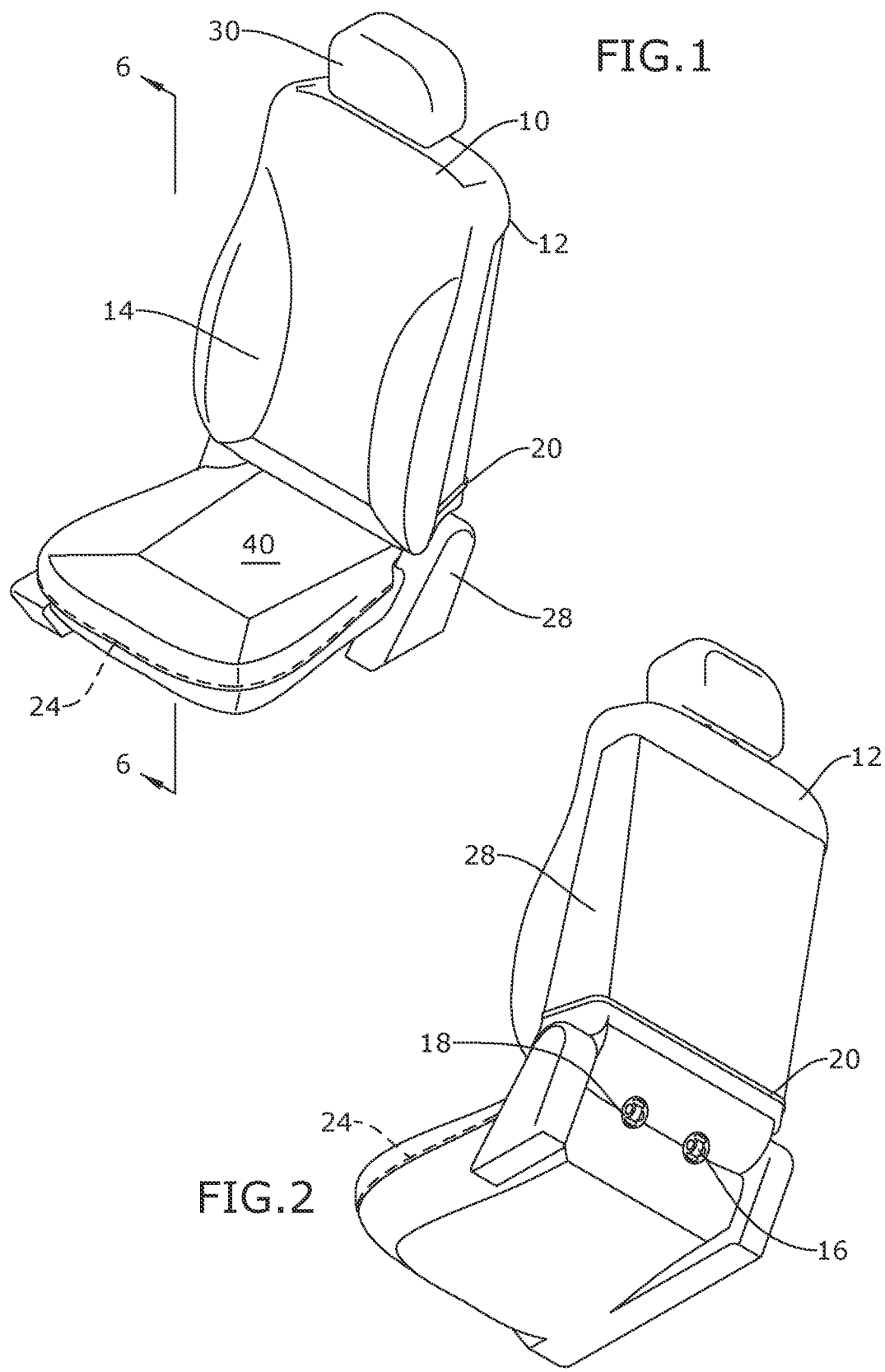
FIG. 1 is a front top perspective view of an exemplary embodiment of the present invention.
FIG. 2 is a rear bottom perspective view of an exemplary embodiment of the present invention.
Figure 3:
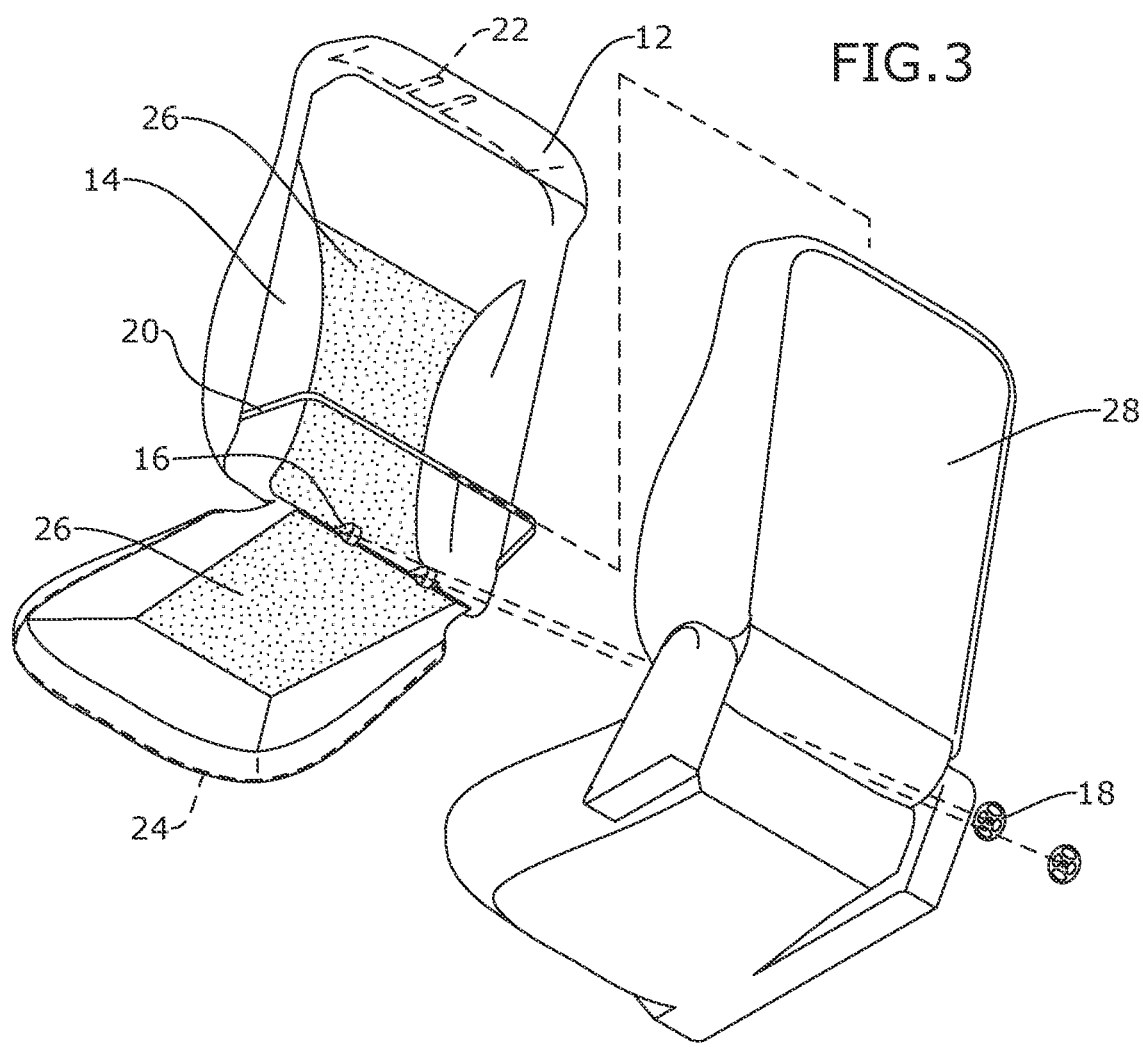
FIG. 3 is an exploded perspective view of an exemplary embodiment of the present invention.
Figure 4:
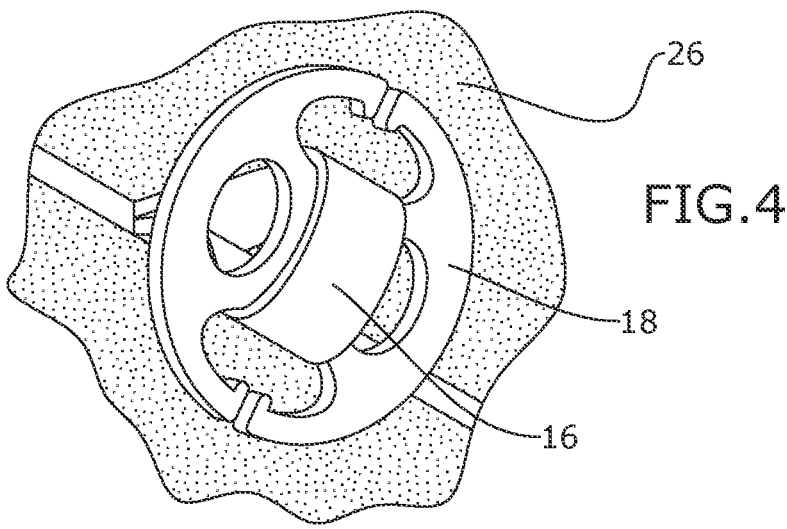
FIG. 4 is a detailed perspective view of an exemplary embodiment of the present invention.

Referring now to FIGS. 1 through 10, the present invention may include a universal seat cover 100 and a method of installing the same. The universal car seat cover system 100 may include an upper front cover portion 10, an upper rear cover portion 12, a front cover portion 14, and a seat cover portion 40. A periphery of the seat cover portion 40 may include an elastic band 24 for snugly engaging a periphery of the seat portion of the vehicular seat 28.

Both the upper front cover portion 10 and the upper rear cover portion 12 are dimensioned and adapted to define a headrest opening 50 that slidably receives the headrest 30 of the vehicular seat 28 and secures to the associated headrest supports 30. Specifically, the headrest opening 50 is defined by a front flap 54 and a rear flap 52 of the upper front cover portion 10 and an upper rear cover portion 12, respectfully. The front and rear flaps 54 and 52 are moveable between (a) an open condition spacing the front and rear flaps 54 and 52 apart for slidably receiving the headrest 30 and (b) an overlapping condition for removably connecting to front and rear flaps 54 and 52 to secure them to the headrest 30. The front and rear flaps 54 and 52 are dimensioned and adapted so that they overlap by a peripheral distance, in the overlapping condition. The rear and front edge portions 34 and 32 of each of the front and rear flaps 54 and 52, respectively, are defined by said peripheral distance. The rear and front edge portions 34 and 32 may include a hook or loop portion of a hook and loop fastener, or equivalent joining elements to removably secure to each other when in the overlapped condition. The rear edge portion 32 may provide and thus be interrupted by one or more headrest post slots 22. In use, the one or more headrest post slots 22 engage the supports 60 of the headrest 30 while the front edge portion 34 overlap and secure to the rear edge portion 32, thereby securing the top cover panel 10 and the rear cover panel 12 together in a secured engagement about the headrest supports 60, ensuring proper alignment and an accurate fit.

The front cover portion 14 embodies a side-less design that allows for airbag deployment. The side-less design means that the universal car seat cover system 100 is backless along a lower, rear portion of the vehicular seat 28. Spanning this coverless rear portion may be a rear strap 20 for securing the front cover portion 14 to the vehicular seat 28.

The seat cover portion 40 and a substantially portion of the front cover portion 14 may provide a non-slip backing 26, such as silicone or other frictionally engaging materials.

One or more anchor straps 16 extending from a lower (peripheral) portion of the front cover portion 14, a rear peripheral portion of the seat cover portion 40, and/or an interface between the two. Each anchor strap 16 is dimensioned and adapted to slide through the space or crevice between the back-support and seat portions of the vehicular seat 28. Each anchor strap 16 may terminate in a loop that operatively associates with a butterfly anchor 18 in such a way that the slack and/or tension in the anchor strap 16 is selectively adaptable and fixable.

During installation, the universal seat cover 100 may be pulled down to cover the backrest of the vehicular seat 28. Once the universal cover seat 100 is properly on the seat 28, then the butterfly discs 18 that were put into place in the beginning, can be pushed through the seat crevice and positioned upwards on the back of the seats. To maintain a more secure fit, additional clips and hardware may be provided to be used on the strap in the front, bottom of the seat, to be hooked onto any part of the seat underneath, etc. The universal seat cover 100 can be smoothed out throughout the seat 28 to secure the textured silicone backing and be sure that it is locked in place.

Finally, the second piece, a headrest cover, can be placed over the headrest 30 in such a way that the headrest 30 slides through the headrest opening 50 with no hardware needed. The elasticity of the front and rear flaps 54 and 52 will stretch when receiving the headrest 30 and also enabling the removable fasteners of the front and rear edge portions 34 and 32 to form the secured engagement, locking the universal seat cover 100 in place.

The butterfly discs 18 will be used to attach to the straps in the middle of the universal seat cover 100. Once the butterfly discs 18 are attached, the elastic back strap 20 can be stretched out and slid over the headrest, pulling the seat cover down. The strap 20 can then be set in the middle or back of the seat for positioning and security.

The universal seat cover 100 may be sewn together with detailed stitching. The elastic trims, elastic straps, hook and loop fasteners at the top, and textured silicone material would be sewn into the fabric in the proper places to ensure the items important functions are maintained. The interior also features a cushion foam for extra comfort. One could accomplish the assembly of the present invention by using an industrial sewing machine. The headrest cover may include three panels sewn together with an elastic trim for a universal fit.

Two-Point Anchoring System for Selective Adaptation of the Universal Car Seat Cover The present invention may also include a universal car seat cover system 100 adapted to provide selective adaptability of portions of the seat cover system 100 based on the unique size of the relevant vehicular seat 28. The universal car seat cover system 100 may include an upper front cover portion 10, an upper rear cover portion 12, a front cover portion 14, and a seat cover portion 40. A periphery of the seat cover portion 40 may include an elastic band 24 for snugly engaging a periphery of the seat portion of the vehicular seat 28.

The upper front cover portion 10 provides a headrest opening 50, defined by a front flap 54 and a rear flap 52. The front and rear flaps 54 and 52 are dimensioned and adapted so that they overlap by a peripheral distance, thereby covering up the headrest opening 50. A rear and front edge portions 34 and 32 of each of the front and rear flaps 54 and 52, respectively, are defined by said peripheral distance. The rear and front edge portions 34 and 32 may provide a hook or loop portion of a hook and loop fastener, or equivalent joining elements to secure to each other when they overlap over the headrest opening 50. The rear edge portion 32 may provide and thus be interrupted by one or more headrest post slots 22. In use, the one or more headrest post slots 22 engage the supports 60 of the headrest 30 while the front edge portion 34 overlap and secure to the rear edge portion 32, thereby securing the top cover panel 10 and the rear cover panel 12 together in a secured engagement about the headrest supports 60, ensuring proper alignment and establishing an upper anchoring point. The front rear edge portion 34 typically overlaps the rear edge portion 32 during the secured engagement.

The seat cover portion 40 and a substantially portion of the front cover portion 14 may provide a non-slip backing 26, such as silicone or other frictionally engaging materials.

One or more anchor straps 16 extending from a lower (peripheral) portion of the front cover portion 14, a rear peripheral portion of the seat cover portion 40, and/or an interface between the two. Each anchor strap 16 is dimensioned and adapted to slide through the space or crevice between the back-support and seat portions of the vehicular seat 28. Each anchor strap 16 may terminate in a loop that operatively associates with a butterfly anchor 18 in such a way that the slack and/or tension in the anchor strap 16 is selectively adaptable and fixable, thereby forming a lower anchor point.

A method of using the present invention may include the following. The universal car seat cover system 100 disclosed above may be provided. A user may, first, stretch the elastic of the upper front cover portion 10 so that the headrest 30 can slide through the headrest opening 50. The user may then pull the entire cover down over the vehicular seat 28.

The user then associates a butterfly anchor 18 to each anchor strap 16 loop, thereby connecting the two separate front cover portion 14 and seat cover portion 40 into, effectively one, joined cushion, and forming the lower anchor point. The butterfly anchor 18 can then be pushed through the vehicular seat's crevice and positioned upwards on the rear of the vehicular seat 28. To maintain a more secure fit, additional hardware can be used on the strap in the front bottom of the seat and hooked onto any part of the seat underneath.

Finally, the headrest cover is placed over the seat's headrest 30. It stays attached by way of the headrest support slots 22, enabling the formation of the secured engagement, and thus the upper anchor point.

By selectively manipulating the lower anchor point, by way of the butterfly anchors 18, and/or selective manipulating the upper anchor point, by way of the rear and front edge connectors 34 and 32, the user can stretch or relax the elastic front cover portion 14 as well as the seat cover portion 40 so that they fit based on the unique size of the relevant vehicle's seats 28.

The universal car seat cover system 100 must be installed piece by piece on the seat. Once it is secured, it will accomplish covering and protecting the original seat, as well as fitting in a secure manner thanks to the universal car seat cover system 100.

It should be understood, of course, that the foregoing relates to exemplary embodiments of the invention and that modifications may be made without departing from the spirit and scope of the invention as set forth in the following claims.

What is claimed is:

1. A universal seat cover, comprising:
a front upper portion;
a rear upper portion, wherein said upper portions, in an overlapped condition, overlap along respective distal ends by a peripheral distance, and wherein said distal ends are movable between the overlapped condition to an open condition providing a headrest opening dimensioned to slidably receive a headrest of a vehicular seat, wherein the headrest opening having a cross-sectional surface area of between twelve to eighteen inches by three to six inches;
removable fasteners on each of the respective distal ends, wherein the removable fasteners connect in the overlapping condition;
one or more headrest support slots along the distal end of the rear upper portion, wherein each headrest slot is dimensioned to slidably receive a support member of said headrest in the overlapping condition;
a front cover portion;
a seat cover portion;
at least one loop extending between the seat cover portion and the front cover portion; and
a butterfly anchor associated with each loop.

2. The universal seat cover of claim 1, further comprising of a textured non-slip silicone backing along the interior surface of the seat cover portion and the front cover portion.

3. The universal seat cover of claim 2, further comprising a fitted elastic trim along a periphery of the seat cover portion.

4. The universal seat cover of claim 3, wherein the front cover portion embodies a side-less design.

5. The universal seat cover of claim 4, further comprising an elastic strap spanning the side-less design.

* * * * *